(12) United States Patent
Tanaka et al.

(10) Patent No.: US 8,536,835 B2
(45) Date of Patent: Sep. 17, 2013

(54) SUPPLY AND DEMAND CONTROL APPARATUS FOR ELECTRIC POWER SYSTEM, AND STORAGE MEDIUM STORING SUPPLY AND DEMAND CONTROL PROGRAM

(75) Inventors: Mari Tanaka, Tokorozawa (JP); Takenori Kobayashi, Tokyo (JP); Koji Toba, Tama (JP); Yoshihiro Ogita, Fuchu (JP); Ryoichi Ichikawa, Fuchu (JP); Akinori Nishi, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 87 days.

(21) Appl. No.: 13/397,159

(22) Filed: Feb. 15, 2012

(65) Prior Publication Data

US 2012/0139499 A1    Jun. 7, 2012

Related U.S. Application Data

(63) Continuation of application No. PCT/JP2010/064206, filed on Aug. 24, 2010.

(30) Foreign Application Priority Data

Aug. 25, 2009    (JP) ................. 2009-194839

(51) Int. Cl.
*H02J 7/00*    (2006.01)
(52) U.S. Cl.
USPC ............................ 320/134; 320/164; 324/433
(58) Field of Classification Search
USPC ................. 320/132, 134, 136, 164; 324/433
See application file for complete search history.

(56) References Cited

U.S. PATENT DOCUMENTS 5,369,353 A * 11/1994 Erdman ..................... 323/207
2007/0145952 A1* 6/2007 Arcena ..................... 320/135

FOREIGN PATENT DOCUMENTS

| JP | 2001-37085 | 2/2001 |
| JP | 2005-102357 | 4/2005 |
| JP | 2006-94649 | 4/2006 |
| JP | 2008-42961 | 2/2008 |

OTHER PUBLICATIONS

International Search Report issued Nov. 30, 2010 in PCT/JP2010/064206 filed Aug. 24, 2010 (with English Translation).
International Written Opinion issued Nov. 30, 2010 in PCT/JP2010/064206 filed Aug. 24, 2010.
International Preliminary Report on Patentability and Written Opinion issued Mar. 22, 2012 in PCT/JP2010/064206.

* cited by examiner

*Primary Examiner* — Edward Tso
*Assistant Examiner* — Aaron Piggush
(74) *Attorney, Agent, or Firm* — Oblon, Spivak, McClelland, Maier & Neustadt, L.L.P.

(57) ABSTRACT

According to one embodiment, the economical load dispatcher calculates a discharging threshold value and a charging threshold value based on a discharging unit price of and a charging and discharging efficiency of the secondary battery and further calculates output allocations of the generators and secondary battery such that the secondary battery is discharged when incremental fuel costs of the generators are higher than the discharging threshold value, whereas the secondary battery is charged when incremental fuel costs of the generators are lower than the charging threshold value.

7 Claims, 4 Drawing Sheets

SUPPLY AND DEMAND CONTROL APPARATUS FOR ELECTRIC POWER SYSTEM, AND STORAGE MEDIUM STORING SUPPLY AND DEMAND CONTROL PROGRAM

CROSS REFERENCE TO RELATED APPLICATIONS

This application is a Continuation Application of PCT Application No. PCT/JP2010/064206, filed Aug. 24, 2010 and based upon and claiming the benefit of priority from prior Japanese Patent Application No. 2009-194839, filed Aug. 25, 2009, the entire contents of all of which are incorporated herein by reference.

FIELD

Embodiments described herein relate generally to supply and demand control of an electric power system which improves economic efficiency by using a secondary battery in economical load dispatching control.

BACKGROUND

The supply and demand operation of an electric power system is broadly divided into supply and demand planning and supply and demand control. In supply and demand planning, an economic operation plan for a generator for the next day is calculated on the basis of the result of demand forecasting. Supply and demand control is performed so as to cause the output of the generator to follow the demand fluctuation or the like of the day. Supply and demand control includes economical load dispatching control that copes with relatively long-period fluctuations and frequency control that copes with relatively short-period fluctuations. In economical load dispatching control, economic output control of a generator is performed according to a fluctuation. In frequency control, output control of a generator is performed so as to keep the frequency constant.

The role of a secondary batter in the supply and demand planning and the supply and demand control is broadly divided into an improvement in economic efficiency by load leveling and the suppression of frequency fluctuations. Load leveling is optimized at the stage of supply and demand planning. As for supply and demand planning that includes a secondary battery, an electric power generation plan has been proposed which causes a generator with a high power generation efficiency to operate at a higher-efficiency operating point and a generator with a low power generation efficiency to stop (Jpn. Pat. Appln. KOKAI Publication No. 2006-94649 [hereinafter, referred to as "Patent document 1"]). As for the suppression of frequency fluctuations, what suppresses such load fluctuations that the generator cannot follow and output fluctuations of natural energy in frequency control making use of the fast response of the secondary battery, has been proposed (Jpn. Pat. Appln. KOKAI Publication No. 2001-37085 [hereinafter, referred to as "Patent document 2"]).

As for the improvement of economic efficiency in load leveling by a secondary battery, optimization is performed at the stage of supply and demand planning and planned operation is performed at the stage of supply and demand control. Patent document 1 is such that a secondary battery is used for load leveling in supply and demand planning. Patent document 2 is such that a secondary battery is used for frequency fluctuation control in frequency control of supply and demand control.

Since economical load dispatching control has been for handling relatively long-period fluctuations, a second battery has not been used. However, in economical load dispatching control, it has been required to improve economic efficiency more by reducing the fuel cost of the generator. In a small-scale electric power system known as a microgrid which, in recent years, has been discussed actively, the introduction of a secondary battery is indispensable because output fluctuations of natural energy generation or the like have great effects on the system. However, the introduction cost of a secondary battery is high and therefore the effect of introducing a secondary battery has been required to be maximized by more effective use.

Under the circumstances, it is desired to provide techniques for producing greater economic effects with a secondary battery, that is, the effect of decreasing the fuel cost of a generator with a secondary battery, by actively operating a secondary battery from the viewpoint of economic efficiency in economical load dispatching control that handles relatively long-period fluctuations in supply and demand control.

DETAILED DESCRIPTION

Embodiments will be described below with reference to the drawings.

In general, according to one embodiment, there is provided a supply and demand control apparatus for an electric power system to which generators and a secondary battery are connected, the apparatus comprising: a data detector which detects a frequency variation and an interconnection line power flow variation in the electric power system; a frequency controller which calculates local requirements of the generators and the secondary battery based on the frequency variation and interconnection line power flow variation detected by the data detector; an economical load dispatcher which calculates an output allocation of each of the generators and secondary battery; and target command value creation units which create target command values of the generators and secondary battery based on the local requirements calculated by the frequency controller and the output allocations calculated by the economical load dispatcher and output the created target command values to the corresponding generators and secondary battery, wherein the economical load dispatcher calculates a discharging threshold value and a charging threshold value based on a discharging unit price of and a charging and discharging efficiency of the secondary battery and further calculates output allocations of the generators and secondary battery such that the secondary battery is discharged when incremental fuel costs of the generators are higher than the discharging threshold value, whereas the secondary battery is charged when incremental fuel costs of the generators are lower than the charging threshold value.

In each embodiment of the invention, desired supply and demand control is realized by a computer-readable supply and demand control program that causes a computer with peripheral devices, including an input/output device, to function as a supply and demand control apparatus for an electric power system. In this case, embodiments of hardware and programs can be modified as needed. In addition, as for techniques shown in each embodiment, not only the supply and demand control apparatus and the supply and demand control method but also a simplicial program for performing supply and demand control or a storage medium in which the program has been stored is also meaningful for inventions.

<First Embodiment>

A first embodiment of the invention will be explained with reference to FIGS. 1 to 3.

Figure 1:
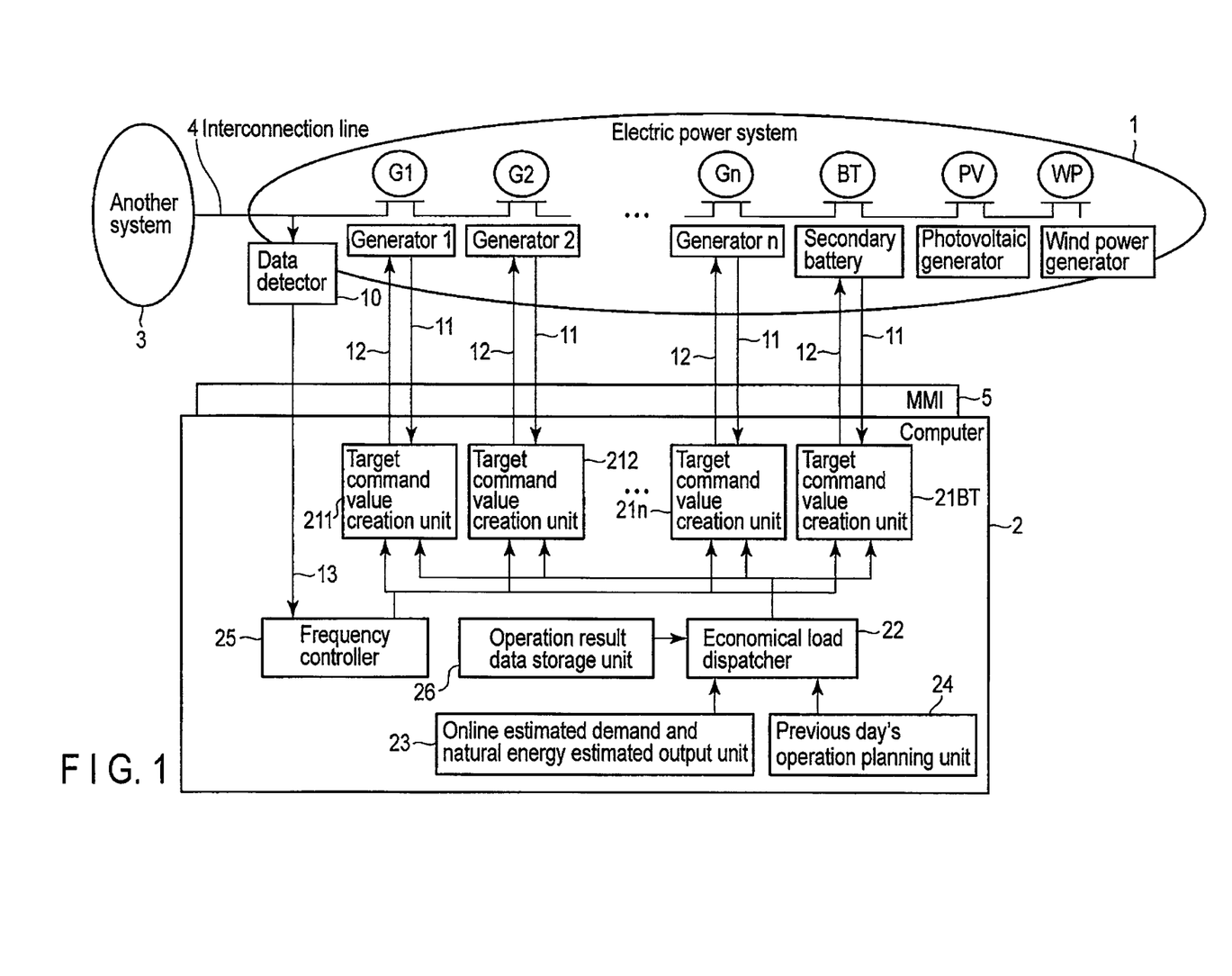
FIG. 1 is a configuration diagram showing the configuration of a supply and demand control apparatus according to a first embodiment of the invention.
Figure 2:
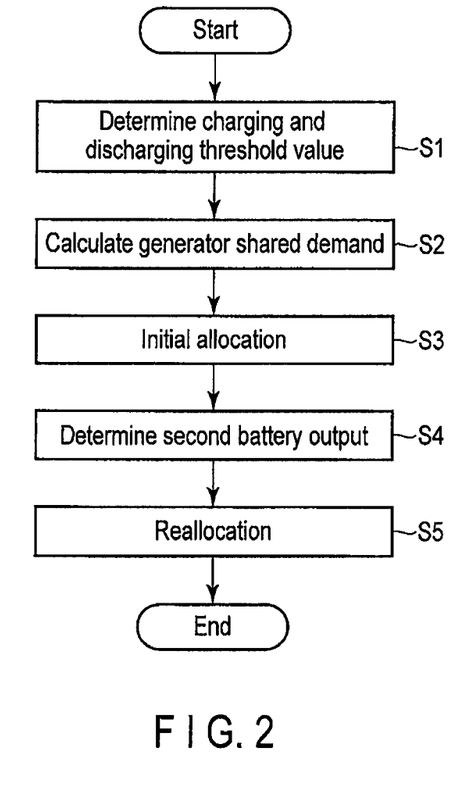
FIG. 2 is a flowchart to explain the contents of processing performed by an economical load dispatcher according to the first embodiment.

FIG. 1 is a configuration diagram showing the configuration of a supply and demand control apparatus of the invention. FIG. 2 is a flowchart to explain the contents of processing performed by an economical load dispatcher. FIG. 3 shows the relationship between charging and discharging threshold values calculated at the economical load dispatcher and incremental fuel cost $\lambda$ of a generator.

(Configuration)

First, the configuration of a supply and demand control apparatus according to the first embodiment will be explained with reference to FIG. 1. In FIG. 1, numeral 1 indicates an electric power system, numeral 2 a computer, and numeral 5 a man-machine interface (MMI). In the electric power system 1, there are provided a plurality of generators G1, G2, ..., Gn, a second battery BT, a photovoltaic generator PV, and a wind power generator WP. They are interconnected to another system 3 via an interconnection line 4. The electric power system 1 may be configured to be an independent system that is not interconnected to another system. Further in the electric power system 1, a data detector 10 is provided. The data detector 10 is a unit that detects a frequency variation (.F) and an interconnection line power flow variation (.PT) in the electric power system 1.

The computer 2 includes target command value creation units 211, 212, ..., 21n, 21BT, an economical load dispatcher 22, an online estimated demand and natural energy estimated output unit 23, a previous day's operation planning unit 24, a frequency controller 25, and an operation result data storage unit 26. The generators G1, G2, ..., Gn and secondary battery BT are connected to the target command value creation units 211, 212, ..., 21n, 21BT in the computer 2 via detection signal lines 11 and control signal lines 12, respectively.

(Operation of Computer 2)

An estimated demand and a natural energy estimated output from the online estimated demand and natural energy estimated output unit 23 and a previous day's operation plan output from the previous day's operation planning unit 24 are input to the economical load dispatcher 22. The economical load dispatcher 22 performs arithmetic processing on the basis of the input estimated demand and natural energy estimated output and the previous day's operation plan as described later to calculate output allocations of generators G1, G2, ..., Gn and secondary battery BT. The economical load dispatcher 22 outputs the calculated output allocations of generators G1, G2, ..., Gn and secondary battery BT to the corresponding target command value creation units 211, 212, ..., 21n, 21BT.

A frequency variation (.f) and an interconnection line power flow variation (.Pt) are input from the data detector 10 to the frequency controller 25 via a signal line 13. The frequency controller 25 then calculates local requirements (AR) of generators G1, G2, ..., Gn and secondary battery BT. The frequency controller 25 outputs the calculated local requirements (AR) of generators G1, G2, ..., Gn and secondary battery BT to the corresponding target command value creation units 211, 212, ..., 21n, 21BT.

The target command value creation units 211, 212, ..., 21n, 21BT create target command values on the basis of the output allocations input from the economical load dispatcher 22 and the local requirements (AR) input from the frequency controller 25 and output the created target command values via the signal lines 12 to generators G1, G2, ..., Gn and secondary battery BT respectively, thereby performing output control of the corresponding generators G1, G2, ..., Gn and secondary battery BT.

(Operation of Economical Load Dispatcher 22)

Next, the processing performed by the economical load dispatcher 22 whereby this invention is characterized will be explained with reference to a flowchart in FIG. 2.

First, the economical load dispatcher 22 determines a charging and a discharging threshold value of the secondary battery BT using expression (1) and equations (2A) and (2B) (step S1). Hereinafter, a charging threshold value and a discharging value may be collectively called a charging and discharging threshold value. To obtain an economic effect by the charging and discharging of the secondary battery BT, electric power charged at a certain unit price is discharged at a unit price higher than the certain unit price, taking into account losses caused by charging and discharging. Therefore, first, a charging and a discharging unit price of the secondary battery BT that satisfy expression (1) are found. Hereinafter, a charging unit price and a discharging unit price may be collectively called a charging and discharging unit price.

$$\text{Charging unit price}/\eta \leq \text{discharging unit price} \quad (1)$$

$\eta$: Charging and discharging efficiency of secondary battery

Here, for example, referring to the charging unit price in each time zone of the secondary battery BT included in the previous day's operation plan output from the previous day's operation planning unit 24, the economical load dispatcher 22 calculates a discharging unit price of the secondary battery BT in each time zone on the basis of the charging unit price in the corresponding time zone, using expression (1).

Next, the economical load dispatcher 22 calculates a charging and a discharging threshold value of the secondary battery BT using equations (2A) and (23). Specifically, the economical load dispatcher 22 calculates an average discharging unit price in the previous day's operation plan on the basis of the discharging unit price of the secondary battery BT in each time zone in the previous day's operation plan calculated using expression (1) and determines the calculated average discharging unit price to be a discharging threshold value. Then, the economical load dispatcher 22 calculates a charging threshold on the basis of the determined discharging threshold value and the charging and discharging efficiency $\eta$ of the secondary battery BT.

$$\text{Discharging threshold value} = \text{Average discharging unit price in previous day's operation plan} \quad (2A)$$

$$\text{Charging threshold value} = \text{discharging threshold value} \times \eta \quad (2B)$$

In addition, in determining a charging and a discharging threshold value, the economical load dispatcher 22 may use equations (2C) to (2H) in addition to equations (2A) and (2B) described above.

(Determining a Charging and a Discharging Threshold Value on the Basis of a Previous Day's or Latest Operation Result)

Using equations (2C) and (2D), the economical load dispatcher 22 can determine a charging and a charging threshold value with reference to the previous day's or latest operation result data stored in the operation result data storage unit 26. Specifically, referring to a discharging threshold value in the previous day's or latest operation result data stored in the operation result data storage unit 26, the economical load dispatcher 22 calculates a discharging threshold value of the secondary battery BT using equation (2C) on the basis of a discharging threshold value on the day when the threshold value was referred to and α. Then, on the basis of the calculated discharging threshold value and the charging discharging efficiency η of the secondary battery BT, the economical load dispatcher 22 calculates a charging threshold value using equation (2D).

$$\text{Discharging threshold value} = \text{discharging threshold value on the day when the reference was made} \times \alpha \quad (2C)$$

$$\text{Charging threshold value} = \text{discharging threshold value} \times \eta \quad (2D)$$

α: α<1.0 and a specific positive value when the amount of discharging in the previous day's or latest operation result data is less than a predetermined specific amount of discharging; and α>1.0 and a specific positive value when the amount of discharging in the previous day's or latest operation result data is greater than the predetermined specific amount of discharging.

(Determining a Charging and a Discharging Threshold Value on the Basis of the Statistical Processing of Operation Result Data on a Plurality of Days)

Using equations (2E) and (2F), the economical load dispatcher 22 can determine a charging and a discharging threshold value on the basis of the statistical processing of operation result data on a plurality of days stored in the operation result data storage unit 26. A specific period is a month or a season and may be a day of the week. Specifically, referring to a discharging unit price in operation result data in a specific period stored in the operation result data storage unit 26, the economical load dispatcher 22 calculates an average discharging unit price of the discharging unit price in the specific period referred to. Then, using equation (2E), the economical load dispatcher 22 determines the calculated average discharging unit price to be a discharging threshold value of the secondary battery BT. Then, on the basis of the determined discharging threshold value and the charging and discharging efficiency η of the secondary battery BT, the economical load dispatcher 22 calculates a charging threshold value using equation (2F).

$$\text{Discharging threshold value} = \text{average discharging unit price in operation result data in a specific period} \quad (2E)$$

$$\text{Charging threshold value} = \text{discharging threshold value} \times \eta \quad (2F)$$

(Determining a Charging and a Charging Threshold Value Taking an Excess Amount into Account)

Using equations (2G) and (2H), the economical load dispatcher 22 can determine a charging and a discharging threshold value, taking into account an excess amount so as to obtain economic effects reliably even if the charging and discharging efficiency of the secondary battery is lower than expected.

Specifically, on the basis of a discharging unit price of the secondary battery BT in each time zone in the previous day's operation plan calculated using expression (1), the economical load dispatcher 22 calculates an average discharging unit price in the previous day's operation plan. Then, using equation (2G), the economical load dispatcher 22 determines the calculated average discharging unit price to be a discharging threshold value. Then, on the basis of the determined discharging threshold value, the charging and discharging efficiency of the secondary battery BT η, and β, the economical load dispatcher 22 calculates a charging threshold value using equation (2H).

$$\text{Discharging threshold value} = \text{Average discharging unit price in previous day's operation plan} \quad (2G)$$

$$\text{Charging threshold value} = \text{discharging threshold value} \times (\eta \times \beta) \quad (2H)$$

β: β≦1.0 and a specific positive value

When having calculated a charging and a discharging threshold value of the secondary battery BT in step S1, the economical load dispatcher 22 then calculates a generator shared demand (step S2). Specifically, on the basis of an estimated demand and a natural energy estimated output from the online estimated demand and natural energy estimated output unit 23, the economical load dispatcher 22 calculates a generator shared demand using equation (3). The natural energy estimated output includes an estimated output of a photovoltaic generator PV (hereinafter, referred to as the PV estimated output) and an estimated output of a wind power generator WP (hereinafter, referred to as the WP estimated output).

$$\text{Generator shared demand} = \text{estimated demand} - (PV \text{ estimated output} + WP \text{ estimated output}) \quad (3)$$

Next, the economical load dispatcher 22 determines an initial allocation (step S3). Specifically, the economical load dispatcher 22 determines an output allocation as an initial allocation of the generator on the assumption that the secondary battery BT is neither charged nor discharged for the generator shared demand calculated in step 2. Then, the economical load dispatcher 22 calculates an incremental fuel cost λ of each generator in the corresponding time cross section.

In determining the output allocations of the generator, the economical load dispatcher 22 further calculates output allocations of parallel generators using, for example, an equal λ method, taking into account a start and stop state of the generator obtained from the previous day's operation plan in the previous day's operation planning unit 24. The equal λ method is generally used in an economical load dispatching of a generator. Use of the equal λ method enables the economical load dispatcher 22 to further calculate an incremental fuel cost λ of the generator.

Next, the economical load dispatcher 22 determines a secondary battery output (step S4). Specifically, the economical load dispatcher 22 compares the charging and discharging threshold values determined in step S1 with the incremental fuel cost λ of the generator calculated in step S3 and determines the charging or discharging of the secondary battery BT using expressions (4A) to (4C). If the comparison result has shown that the incremental fuel cost λ of the generator is lower than the charging threshold value of the secondary battery BT as represented by expression (4A), the economical load dispatcher 22 determines that "the secondary battery BT is to be charged." If the comparison result has shown that the incremental fuel cost λ of the generator lies between the charging threshold value and discharging threshold value of the secondary battery BT as represented by expression (48), the economical load dispatcher 22 determines that "the secondary battery BT is to be neither charged nor discharged." If the comparison result has shown that the incremental fuel cost λ of the generator is higher than the discharging threshold value of the secondary battery BT as represented by expression (4C), the economical load dispatcher 22 determines that "the secondary battery BT is to be discharged." Determining the charging and discharging of the secondary battery BT in this way enables electric power charged at a certain charging unit price to be discharged at a discharging unit price higher than the certain charging unit price, taking into account losses caused by charging and discharging. This enables economic effects to be obtained by the charging and discharging of the secondary battery BT.

Incremental fuel cost λ<charging threshold
value→Secondary battery $BT$ is to be charged (4A)

Charging threshold value≦incremental fuel cost
λ≦discharging threshold value→Secondary battery $BT$ is to be neither charged nor discharged (4B)

Discharging threshold value<incremental fuel cost
λ→Secondary battery $BT$ is to be discharged (4C)

Figure 3:
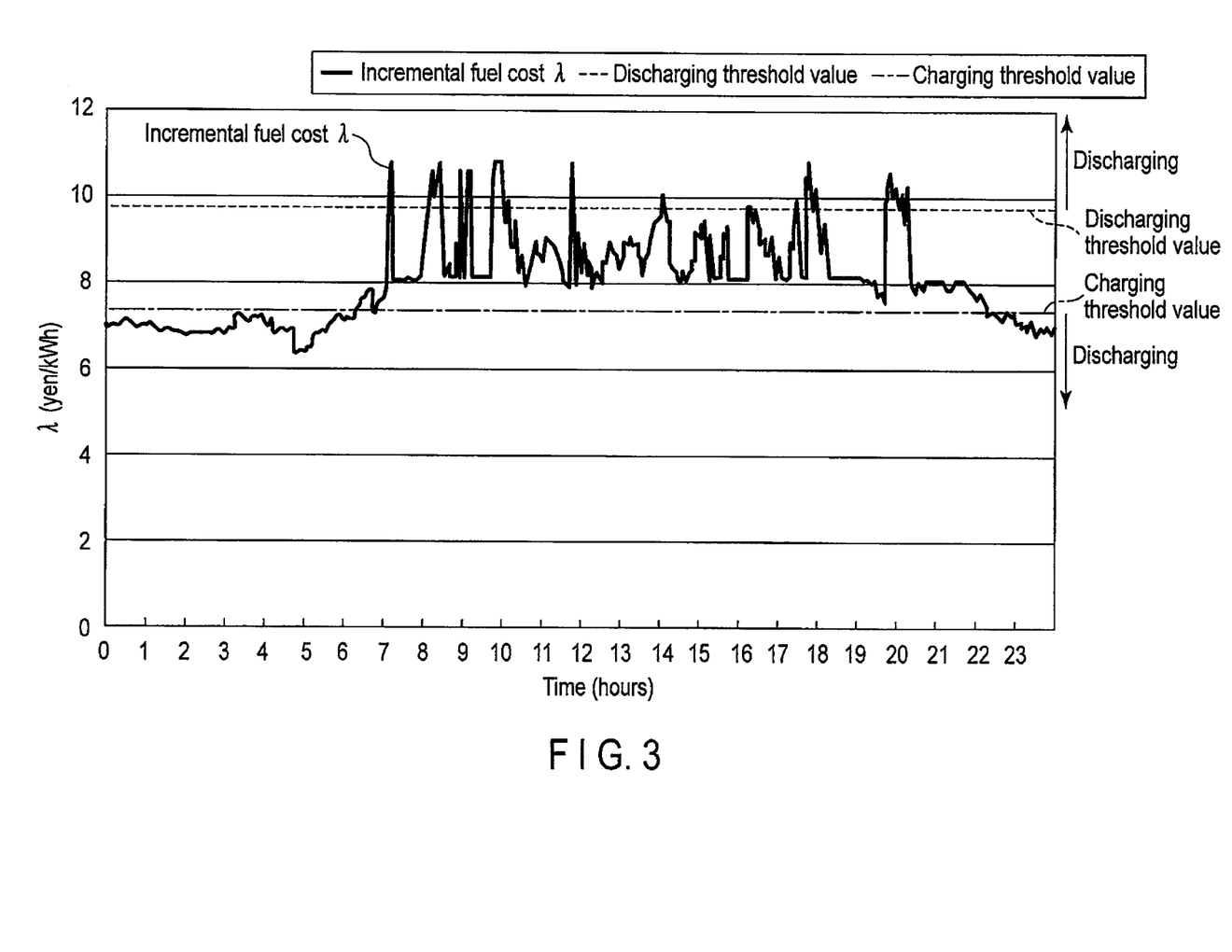
FIG. 3 shows the relationship between charging and discharging threshold values calculated at the economical load dispatcher and incremental fuel cost $\lambda$ of a generator in the first embodiment.

FIG. 3 shows an example of the charging and discharging threshold values determined in step S1 and the incremental fuel cost λ of the generator calculated in step S3. In FIG. 3, for example, the secondary battery BT is charged because the incremental fuel cost λ is lower than the charging threshold value from 0 hours to 6 hours. Since the incremental fuel cost λ exceeds the charging threshold value from 7 hours to 22 hours, the secondary battery BT is not charged. If there is a time when the incremental fuel cost λ further exceeds the discharging threshold value, the secondary battery BT is discharged at the time. In FIG. 3, charging threshold values and discharging threshold values are shown from 0 hours to 24 hours. These values may change each time calculations are made because the charging threshold values and discharging threshold values are calculated according to each control period.

The charging and discharging outputs of the secondary battery BT are determined in a range where the sum total of the charging and discharging outputs and the planned charging and discharging outputs of the secondary battery by the previous day's operation planning unit 24 does not exceed the kW capacity of the secondary battery and in a range where the amount of accumulated electricity based on the sum total does not exceed the kWh capacity of the secondary battery. For example, in discharging, since the incremental fuel cost λ of the generator becomes lower as a result of the discharging of the secondary battery, a discharging output that prevents the sum total from becoming less than or equal to the discharging threshold value may be calculated algebraically. Alternatively, a rough standard in discharging may be determined previously. Similarly, in charging, since the incremental fuel cost λ of the generator becomes higher as a result of the charging of the secondary battery, a charging output that prevents the sum total from becoming greater than or equal to the charging threshold value may be calculated algebraically. Alternatively, a rough standard in charging may be determined previously.

Next, the economical load dispatcher 22 reallocates the output allocations as the initial allocations of the individual generators calculated in step S3 on the basis of the secondary battery outputs calculated in step S4 (step S5). Specifically, the economical load dispatcher 22 subtracts the secondary battery output (a positive value in discharging and a negative value in charging) calculated in step S4 from the generator shared demand calculated in step S2, determines the resulting value to be a new generator shared demand, and redetermines the output allocations of generators G1 to Gn on the basis of the new generator shared demand, thereby achieving reallocation.

The economical load dispatcher 22 performs the processes in step S1 to step S5 according to each control period and calculates the output allocations of the secondary battery BT and generators G1 to Gn each time.

(Effects)

As described above, the first embodiment enables economical load dispatching control to perform control using a secondary battery and further enables an economic operation with a secondary battery compatible with relatively long-period fluctuations handled by secondary battery economical load dispatching control. Therefore, it is possible to perform supply and demand control of an electric power system that produces greater economic effects with a secondary battery, or has the effect of decreasing more the fuel cost of the generator with a secondary battery.

<Second Embodiment>

Next, a second embodiment will be explained with reference to FIG. 4.

The configuration of a supply and demand control apparatus according to the second embodiment is the same as that of the first embodiment shown in FIG. 1.

(Difference from the First Embodiment)

Figure 4:
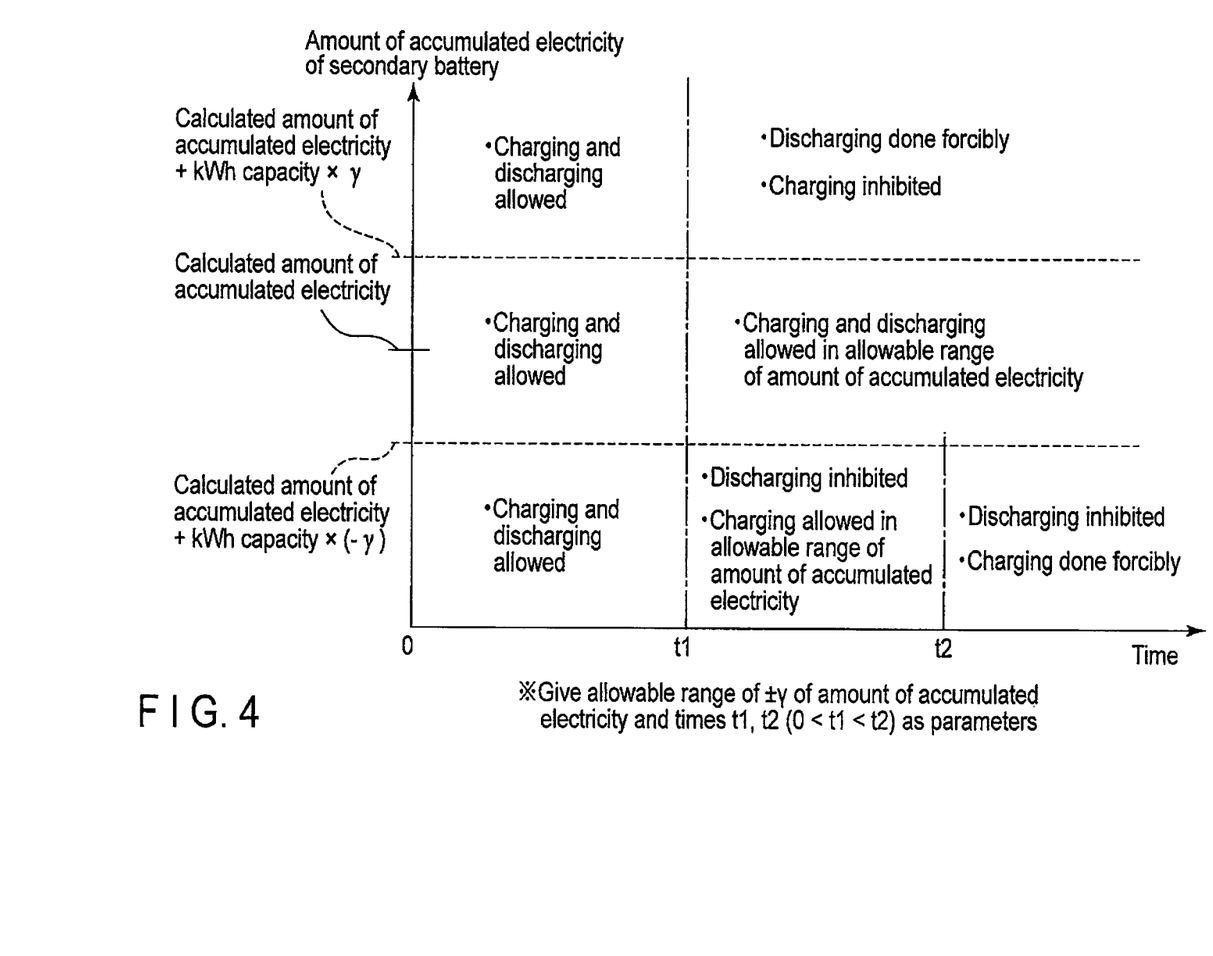
FIG. 4 shows restrictions used in determining a secondary battery output of an economical load dispatcher according to a second embodiment of the invention.

The second embodiment is such that restrictions shown in FIG. 4 are placed in determining a secondary battery output of the economical load dispatcher 22 (in step S4 of FIG. 2) in the first embodiment. An allowable range of ±γ of the amount of accumulated electricity of the secondary battery BT and times t1, t2 (0<t1<t2) in the restrictions shown in FIG. 4 have predetermined values. The economical load dispatcher 22 determines a method of controlling the charging and discharging of the secondary battery BT on the basis of expressions (4A) to (4C) under the restrictions in FIG. 4. The restrictions in FIG. 4 are placed so that the amount of accumulated electricity of the secondary battery BT may lie within a specific range centering on a predetermined planned amount of accumulated electricity (=a range from "planned amount of accumulated electricity+kWh capacity×γ" to "planned amount of accumulated electricity+kWh capacity×(−γ)".

When the amount of accumulated electricity of the secondary battery BT has exceeded "planned amount of accumulated electricity+kWh capacity×γ," the secondary battery BT is allowed to be charged and discharged in a time zone before time t1. In a time zone after time t1, the secondary battery BT is discharged forcibly and is inhibited from being charged. When the amount of accumulated electricity of the secondary battery BT is between "planned amount of accumulated electricity+kWh capacity×γ" and "planned amount of accumulated electricity+kWh capacity×(−γ)," the secondary battery BT is allowed to be charged and discharged in a time zone before time t1. In a time zone after time t1, the secondary battery BT is allowed to be charged and discharged in an allowable range of the amount of accumulated electricity. When the amount of accumulated electricity of the secondary battery BT is lower than "planned amount of accumulated electricity+kWh capacity×(−γ)," the secondary battery BT is allowed to be charged and discharged in a time zone before time t1. In a time zone from time t1 to time t2, the secondary battery BT is inhibited from being discharged and is allowed to be charged in an allowable range of the amount of accumulated electricity. In a time zone after time t2, the second battery BT is inhibited from being discharged and is charged forcibly.

(Effects)

As described above, with the second embodiment, the amount of accumulated electricity of the secondary battery BT can be prevented from deviating significantly from the planned value, with the result that a next day's operation plan need not be reexamined.

<Summing-Up>

As described in detail, the above embodiments enable economical load dispatching control to perform control using a secondary battery and further enable an economic operation with a secondary battery compatible with relatively long-period fluctuations handled by economical load dispatching control. Therefore, it is possible to perform supply and demand control of an electric power system that produces greater economic effects with a secondary battery, or has the effect of decreasing more the fuel cost of the generator with a secondary battery.

The various functions and processing procedures described in the embodiments can be stored in the form of computer programs into a computer-readable storage medium (e.g., a magnetic disk, an optical disk, or a semiconductor memory). The programs can be read and executed by a processor as needed. Such a computer program may be delivered by transferring the program from one computer to another computer via a communication medium.

This invention is not limited to the above embodiments and, in the present and future implementation phase, may be embodied in still other ways by modifying the component elements without departing from the spirit or essential character thereof. In addition, various inventions may be formed by combining suitably a plurality of component elements disclosed in the embodiments. For example, some components may be removed from all of the component elements constituting the embodiments. Furthermore, component elements used in two or more embodiments may be combined suitably.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A supply and demand control apparatus for an electric power system to which generators and a secondary battery are connected, the apparatus comprising:
   a data detector that detects a frequency variation and an interconnection line power flow variation in the electric power system;
   a frequency controller that calculates local requirements of the generators and the secondary battery based on the frequency variation and interconnection line power flow variation detected by the data detector;
   an economical load dispatcher that calculates an output allocation of each of the generators and secondary battery; and
   target command value creation units that create target command values of the generators and secondary battery based on the local requirements calculated by the frequency controller and the output allocations calculated by the economical load dispatcher and output the created target command values to the corresponding generators and secondary battery,
   wherein the economical load dispatcher calculates a discharging threshold value and a charging threshold value based on a discharging unit price of and a charging and discharging efficiency of the secondary battery and further calculates output allocations of the generators and secondary battery such that the secondary battery is discharged when incremental fuel costs of the generators are higher than the discharging threshold value, whereas the secondary battery is charged when incremental fuel costs of the generators are lower than the charging threshold value.

2. The supply and demand control apparatus for an electric power system according to claim 1, wherein the economical load dispatcher calculates an average discharging unit price in a previous day's operation plan of the secondary battery and determines the calculated average discharging unit price to be a discharging threshold value.

3. The supply and demand control apparatus for an electric power system according to claim 1, further comprising an operation result data storage unit that stores operation result data,
   wherein the economical load dispatcher determines a discharging threshold value with reference to a previous day's or latest operation result data stored in the operation result data storage unit.

4. The supply and demand control apparatus for an electric power system according to claim 1, further comprising an operation result data storage unit that stores operation result data,
   wherein the economical load dispatcher refers to operation result data on a plurality of days stored in the operation result data storage unit, calculates an average discharging unit price from the data, and determines the calculated average discharging unit price to be a discharging threshold value.

5. The supply and demand control apparatus for an electric power system according to claim 1, wherein the economical load dispatcher calculates a discharging threshold value and a charging threshold value based on a discharging unit price of and a charging and discharging efficiency of the secondary battery and an excess amount determined taking into account a case where the charging and discharging efficiency of the secondary battery is lower than expected.

6. The supply and demand control apparatus for an electric power system according to claim 1, wherein the economical load dispatcher places restrictions in calculating output allocations of the secondary battery such that the amount of accumulated electricity of the secondary battery lies within a specific range centering on a planned amount of accumulated electricity.

7. A non-transitory computer-readable storage medium storing a supply and demand control program that causes a computer to function as a supply and demand control apparatus for an electric power system to which generators and a secondary battery are connected, the program causing the computer to function as:
   a frequency controller that calculates local requirements of the generators and the secondary battery based on a frequency variation and an interconnection line power flow variation detected from the electric power system;
   an economical load dispatcher that calculates an output allocation of each of the generators and secondary battery; and target command value creation units that create target command values of the generators and secondary battery based on the local requirements calculated by the frequency controller and the output allocations calculated by the economical load dispatcher and output the created target command values to the corresponding generators and secondary battery, wherein the economical load dispatcher calculates a discharging threshold value and a charging threshold value based on a discharging unit price of and a charging and discharging efficiency of the secondary battery and further calculates output allocations of the generators and secondary battery such that the secondary battery is discharged when incremental fuel costs of the generators are higher than the discharging threshold value, whereas the secondary battery is charged when incremental fuel costs of the generators are lower than the charging threshold value.

* * * * *